Feb. 17, 1953  P. RAIBOURN  2,628,902
PROCESS OF PRODUCING COLORED PHOTOGRAPHS
Filed April 29, 1947
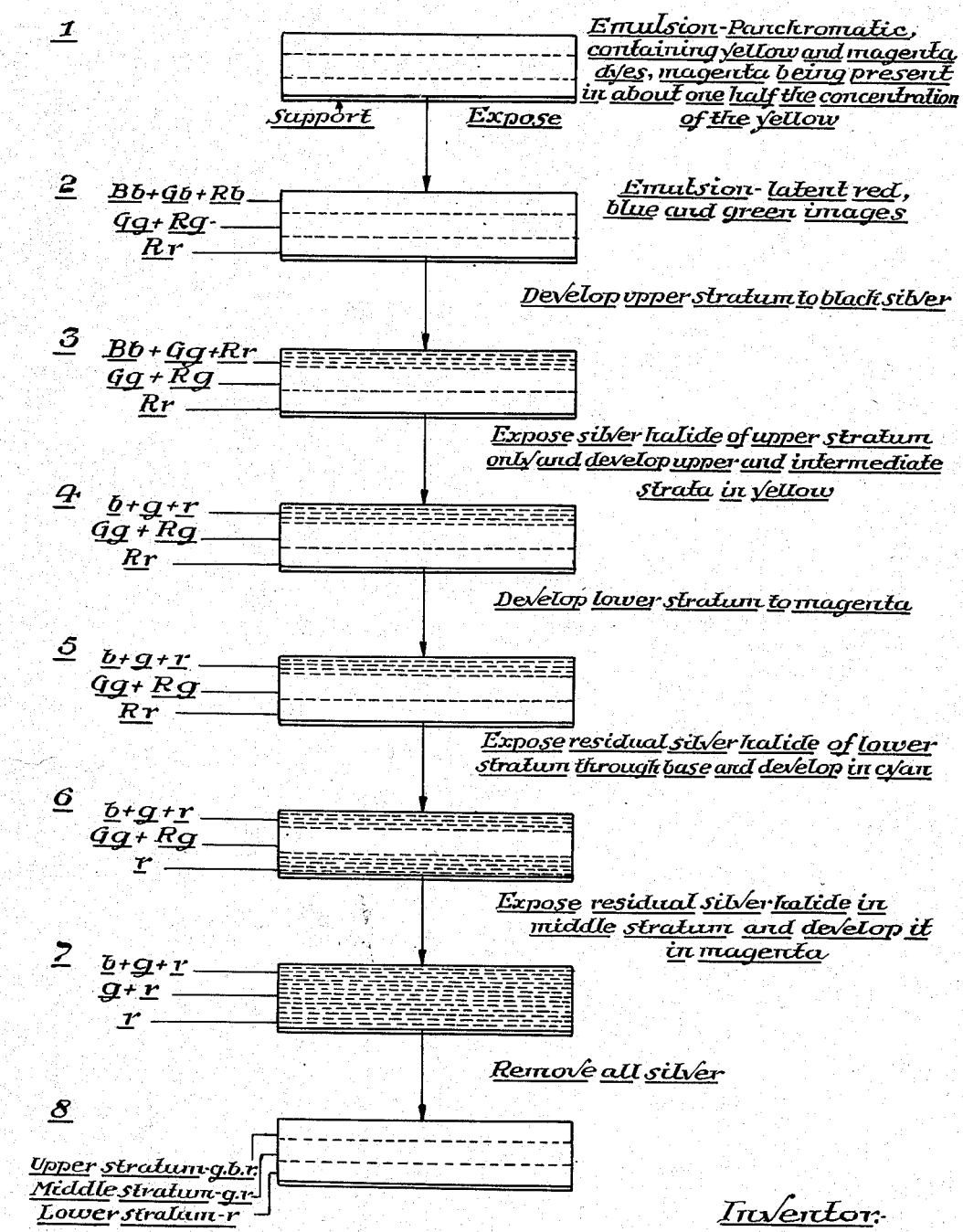
Inventor:
Paul Raibourn
by his Attorneys
Darby & Darby Patented Feb. 17, 1953

2,628,902

UNITED STATES PATENT OFFICE 2,628,902

PROCESS OF PRODUCING COLORED PHOTOGRAPHS

Paul Raibourn, Southport, Conn.

Application April 29, 1947, Serial No. 744,771

3 Claims. (Cl. 95—2)

This invention relates to color photography, and is characterized by the production of a satisfactory and approximately correct rendition of the original subject, having a plurality of superposed color images, preferably three, in a single light sensitive emulsion.

The many objects and advantages of this invention will be apparent from the following detailed description of the method comprising it.

This invention resides substantially in the steps and series of steps as herein described, and the products thereof.

An outstanding characteristic of this invention is the use of a single light sensitive emulsion layer, panchromatic film for the formation directly therein of multicolor separations in superposed registered relation.

As an example but without desiring to be limited thereby, the thickness of the film will be such that the film when processed as hereinafter specified is capable of a blue shadow density of 2. The emulsion is dyed throughout with a yellow dye of a high concentration, and is then dyed with a magneta dye in a concentration one-half of that of the yellow. Other concentrations of the magneta dye, less than that of the yellow, may be used. As a criterion, as to the concentration of the yellow dye to be used, this concentration should be just sufficient to confine the blue portion, as determined by a Wratten C5 filter, of a diffused white high light, in the upper third of the emulsion. As will appear, as the description proceeds, the single emulsion layer is divided in the process into three imaginary layers, in a direction at right angles to the plane of the film. Such stratification could also be produced by controlled penetration of dyes into the emulsion in well known manners. The term "selective dyeing" as used herein includes dyeing throughout with dyes of two different subtractive, primary colors, or dyeing throughout with one of said colors and to a controlled depth with the other, or dyeing to approximately the same controlled depth with both of said colors, or dyeing to different depths with each of the colors, the depths being preferably, but not necessarily, multiples of one-third of the thickness of the emulsion. As an example, some of the basic dyes or dyes used in the wash-off relief process can be used for this purpose. The magneta dye may be replaced by cyan dye in which case the relative position of the final cyan and magneta images, in position and processing, will be reversed.

The accompanying self-explanatory drawing, in the form of a flow-diagram, illustrates the film, as described above, and the processing thereof, as set forth in the following detailed description.

Such a film is properly exposed as is all reversal color film to the scene to be photographed whereupon it will have latent images as follows:

1. The upper (outer) third of the emulsion will contain a latent image composed of a blue component $Bb$, a green component $Gb$ and a red component $Rb$ plus other unexposed silver halide.

2. The next (middle) third imaginary layer of the film will contain a latent image composed of a green component $Gg$ and a red component $Rg$ plus other unexposed silver halide. This results since the yellow has confined the blue image to the upper ⅓ layer and the magenta confines the green to the upper ⅔ of the total emulsion.

3. The last (adjacent the base) third imaginary layer of the film will contain a latent image composed of a red component $Rr$ plus other unexposed silver halide.

The relation of the depth of the images in the various imaginary layers may be controlled by varying the concentration of the dyes in the emulsion.

The process in general may be understood if a summary description is given of how the yellow (minus blue) image is obtained.

This exposed film is processed so that the upper third or outer layer is developed by controlled penetration, using a developer, such as Eastman D-76 or DK-50. In this layer, there results, a black and white negative image made up of the components $Bb, + Gb$ and $Rb$, as a negative.

If the remainder of the silver halide in this imaginary upper layer is exposed to light where the penetration of the light is limited to the upper layer by dye, or other well known means, and then developed to color with a yellow coupler dye, in a well known manner, there would be produced a desired yellow subtractive image as is commonly produced in several well known color processes less image $Gb$ and $Rb$. If $Gb$ equals $Gg$ and $Rb$ equals $Rg$, and if the exposed silver halide (latent image) of the second layer also is developed by controlled penetration with a yellow coupler dye, yellow would be added to the middle layer equal to $Gb+Rb$. The result would be the desired yellow image.

It will be understood that where the silver halide in a single imaginary layer is to be exposed so as to be rendered developable, the light by which the silver halide is rendered developable can be limited to this layer by the use of dyes in the emulsion, whether wet or dry.

In line with the above general statement for the yellow image, the process is to expose the film and develop the latent image of the outer imaginary layer, by controlled penetration, to a black and white silver image, as explained above. The outer layer is then exposed with sufficient light, controlled by dye or other means, preferably ultra-violet or blue light, so it is developable using a developer which by controlled penetration develops the latent images in the second layer at the same time. This development may be carried out by well known toning, direct development, or coupler procedures to develop the latent reversal image in the outer layer to silver along with a yellow image and the latent image in the middle layer to silver and yellow.

Wherever development to a color is specified herein it may be either by the well known processes of toning, direct color development or coupler color development.

In the second layer at this stage of the process, there is unexposed and undeveloped silver halide which is the desired reversal positive to be colored magenta minus $Rg$. If we now develop latent image $Rr$, which is equal to $Rg$, to a magenta then we have in total the desired reversal magenta image. The lower imaginary layer adjacent the base is exposed through the base by light controlled in its penetration to that layer and developed to silver and cyan which is the desired cyan component.

All the remaining silver halide in the middle layer is then exposed to light and this image is then developed to silver and magenta in the usual manner.

All the silver now in the emulsion is then removed with Farmer's reducer.

There thus results a perfect reproduction of the original scene in full color provided the density matrix of the dyes which form the color images is as follows:

|  | Cyan | Magenta | Yellow |
|---|---|---|---|
| Red | 1.0 | 0 | 0 |
| Green | 0 | 1.0 | 0 |
| Blue | 0 | 0 | 1.0 |

The following is given as a somewhat more graphic illustration of the process described above. The original latent image as explained, in the three imaginary layers contains the following components:

$$Bb \quad Gb \quad Rb \quad \text{outer layer}$$
$$Gg \quad Rg \quad \text{middle layer}$$
$$Rr \quad \text{final layer}$$

The outer layer is developed to a black and white image, exposed to ultra-violet light or light which due to a dye in the emulsion penetrates to and renders developable only the silver halide in the first layer and that layer and the latent image in the middle layer are developed to silver and yellow. The resulting images in the two layers can be illustrated graphically thus:

silver   $(Bb \quad Gb \quad Rb)$   $1-Bb-Gb-Rb$   silver and yellow
silver
halide   $1-Gg-Rg$   $+Gb+Rb$
_____
$1-Bb$   silver and yellow The latent image in the inner layer is then developed to silver and magenta.

The lower layer is then exposed through the base by controlled light penetration and developed to silver and cyan which can be illustrated symbolically as:

$$\text{Cyan} = 1 - Rr$$

The remaining silver halide in the middle layer is then exposed and developed to silver and magenta giving the following result graphically:

$$1 - Gg - Rg$$

We now have magenta images of:

$1-Gg-Rg$   middle layer
$Rr$ to magenta equalling   $Rg$   lower layer
_____
$1-Gg$ It is helpful in the foregoing example that the green record images in the upper layer and the middle layer be approximately equal and the red record images in all three layers be approximately equal. These can be equalized by varying the inertia and contrast characteristics of the various developers used by increasing the alkalinity, changing their characteristics by silver halide solvents such as potassium thiocyanate or hypo or by restraining development by inhibitors such as potassium bromide.

It is also helpful that the light sensitive emulsion show a greater sensitivity for the image which will record in all three depths of the emulsion such as the red record image in the foregoing example. It is also helpful if the light sensitive emulsion show a greater sensitivity for the image which will record in two depths than that which will record in one depth. Such light sensitive emulsions are well known in commercial practice.

It will be apparent to those skilled in the art that the above processing procedure can be modified to correct any deviations from the above ideal color matrix so that masking can be effected by means of the dyes which exist in the various layers.

It will be assumed that the printing colors have the following density matrix for subtractive color as often approximately encountered in practice.

|  | Cyan | Magenta | Yellow |
|---|---|---|---|
| Red | 1.0 | 0.10 | 0.02 |
| Green | 0.40 | 1.0 | 0.10 |
| Blue | 0.10 | 0.50 | 1.0 |

From the above it will be seen that the desired yellow image should approximately equal a reversal of the blue record images from which 50% of the green record image and 10% of the red record images are deducted and the desired magenta image would be a reversal of the green record image from which 40% of the red record image is deducted.

As before, the outer layer is developed to a black and white silver image having the components $$Bb \quad Gb \quad Rb$$

The remaining silver halide of the outer layer is exposed to ultra-violet or blue light which due to dye or emulsion characteristics is confined to rendering the upper layer developable and developed to silver and yellow by controlled penetration. As a result of exposure the yellow image can be graphically illustrated as:

$$1 - Bb - Gb - Rb$$

By control of penetration and time of development and developer characteristics the following silver and yellow images can be obtained for the existing latent image in the other layers:

$$+0.5+0.5Rg \quad \text{second layer}$$
$$+0.4Rr \quad \text{third layer}$$

The final result of this processing is that the yellow image in the layers is graphically represented as:

$1-Bb-0.5Gb-0.1Rb$ which was the desired yellow image.

The image in the middle layer is developed to silver (black and white) by controlled diffusion so that the following results:

$$0.5Gb+0.5Rg$$

The remaining latent image in the third layer is then developed to magenta having the value $0.6Rr$. The film is then exposed through the base with a light which just renders the third layer developable and the third layer developed to silver and cyan which can be represented as $1-Rr$. The remaining silver halide in the middle layer is then exposed and developed to silver and magenta and the result can be graphically represented as:

second layer $\quad 1-Gg-Rg$
third layer $\quad \underline{0.6Rr}$; if $Rg=Rr$
$\quad 1-Gg-0.4Rr$ Thus, it will be seen that by modifying the basic processing procedure corrections for deviations of the printing colors from the ideal can be made in the negatives so that in printing therefrom masking is automatically effected by means of the colored images which exist in the various layers.

It will also be realized that the principles disclosed herein will work just as well if the film is exposed through the base, the dyes in the emulsion serving as anti-halation dyes, and the processing being changed accordingly.

What is claimed is:

1. A method of producing a photograph in colors of the original scene, comprising the steps of exposing a panchromatically sensitized silver halide emulsion, said emulsion dyed yellow throughout in high concentration and magenta in about one-half the concentration of the yellow, the exposure and dyeing producing an upper stratum containing an image of the blue, green and red aspects of the scene, a middle stratum containing only the green and red aspects of the scene, and a lower stratum containing only the red aspect of the scene, developing the upper stratum to a black silver image reversal exposing the silver halide of said upper stratum only and, developing it and the latent image in the intermediate stratum in yellow, developing the latent image of the lower stratum to magenta, exposing the residual silver halide of the lower stratum and developing it in cyan, exposing the residual silver halide in the middle stratum and developing it in magenta, and removing all the silver from the emulsion.

2. A method of producing a photograph in colors of the original scene, comprising the steps of exposing a panchromatically sensitized silver halide emulsion dyed uniformly throughout in two subtractive colors, the one dye being present in about one-half the concentration of the other, the exposure and dying producing an upper stratum containing an image of the blue, green and red aspects of the scene, a middle stratum containing only two of said aspects of the scene and a lower stratum containing only one of said two aspects of the scene, developing the upper stratum to a black silver image, reversal exposing the silver halide of said upper stratum only and developing it and the latent image in the intermediate stratum in one subtractive color, developing the latent image of the lower stratum and the originally unexposed portions of the intermediate stratum in a second subtractive color, and developing the originally unexposed portions of the lower stratum in the third subtractive color and removing all the silver from the emulsion.

3. The method in accordance with claim 2 in which the two said subtractive colors are yellow and cyan, and the cyan is present in about one half the concentration of the yellow.

PAUL RAIBOURN.

REFERENCES CITED

The following references are of record in the file of this patent:

UNITED STATES PATENTS

| Number | Name | Date |
|---|---|---|
| Re. 18,680 | Troland | Dec. 6, 1932 |
| 519,646 | Roche | May 8, 1894 |
| 1,538,996 | Mannes et al. | May 26, 1925 |
| 1,804,727 | Weaver | May 12, 1931 |
| 1,966,330 | Burwell | July 10, 1934 |
| 2,028,279 | Gaspar | Jan. 21, 1936 |
| 2,044,864 | Troland | June 23, 1936 |
| 2,088,523 | Knoche | July 27, 1937 |
| 2,147,112 | Schneider | Feb. 14, 1939 |
| 2,159,600 | Murray | May 23, 1939 |
| 2,193,931 | Michaelis | Mar. 19, 1940 |
| 2,431,996 | Duerr et al. | Dec. 2, 1947 |
| 2,449,966 | Hanson | Sept. 21, 1948 |
| 2,464,798 | Duerr et al. | Mar. 22, 1949 |

FOREIGN PATENTS

| Number | Country | Date |
|---|---|---|
| 340,278 | Great Britain | Dec. 17, 1930 |